INVENTOR
JAMES K. HAMILTON
BY
ATTORNEYS

Patented Apr. 22, 1952

2,593,557

UNITED STATES PATENT OFFICE 2,593,557

PILOT CONTROLLED GAS PRESSURE REGULATOR

James K. Hamilton, Plainfield, N. J., assignor to Air Reduction Company, Incorporated, a corporation of New York Application September 26, 1947, Serial No. 776,281

1 Claim. (Cl. 50—11)

This invention relates to gas pressure regulators and more particularly to improvements in gas pressure regulators of the pilot-controlled or pilot-loaded type.

In a pilot-controlled regulator the diaphragm is loaded by regulated gas pressure rather than by a spring, the gas for this purpose being taken from the gas supply at the high-pressure side of the regulator and passed through an adjustable pilot regulator to reduce its pressure to some predetermined value that is suitable for loading the diaphragm of the main regulator and that determines the pressure of the gas delivered by the main regulator. Heretofore the pilot regulator has been a separate instrumentality independent of the main regulator body. This has a number of disadvantages such as increasing the size and weight of the complete regulator and creating manufacturing difficulties.

According to the present invention the pilot regulator and the main regulator are built into the same body thereby producing a pilot-controlled regulator in the form of a single instrumentality which is more compact, lighter in weight, and easier to manufacture than previous pilot-loaded regulators, and possesses various other advantages over them hereinafter mentioned.

A pilot-controlled regulator embodying the invention is illustrated in the accompanying drawing, in which.

Figures 1, 2:
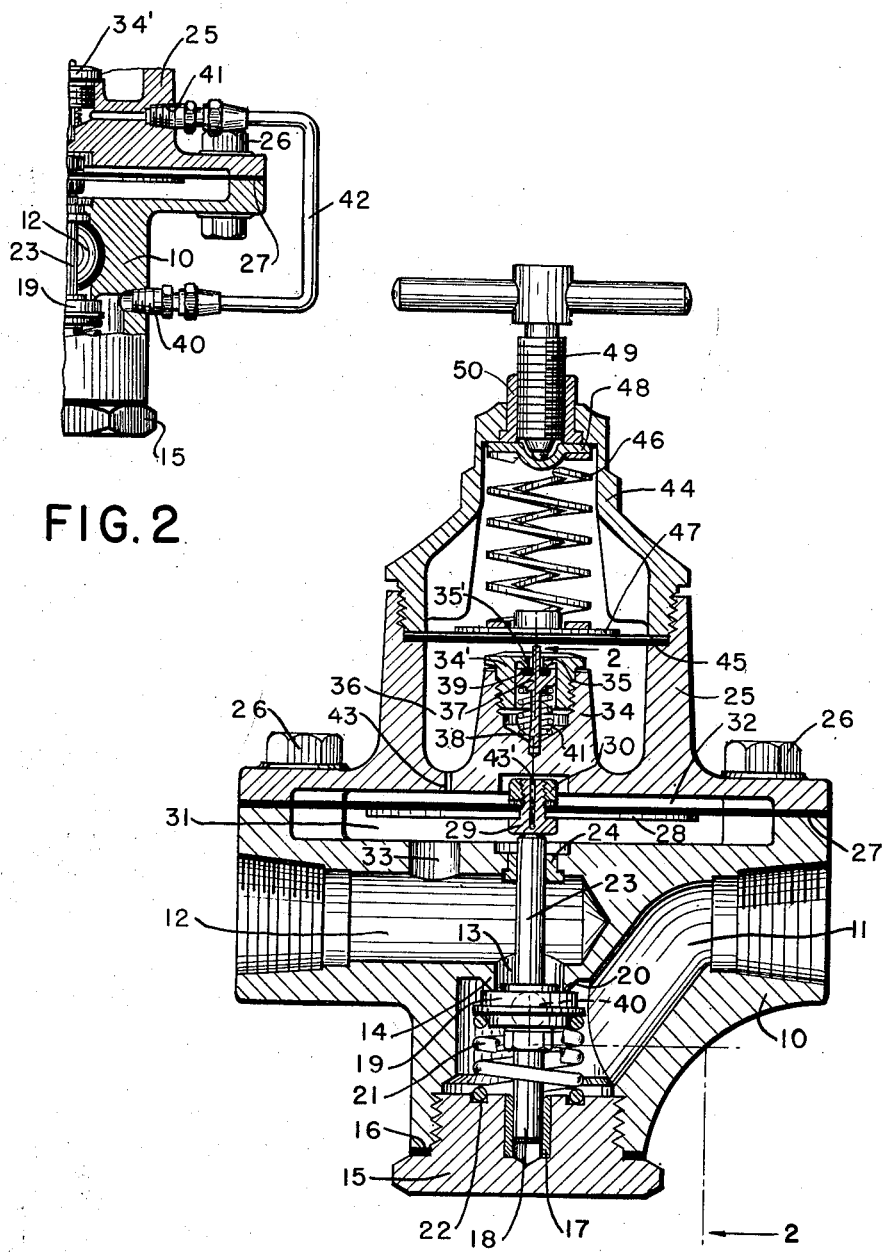
Figure 1 is a vertical section through the regulator.
Fig. 2 is a partial vertical section through the regulator taken on the line 2—2 of Fig. 1 and drawn to a smaller scale.

Referring first to Fig. 1, the regulator comprises a body or housing 10 containing a high-pressure gas inlet passage 11 and a low-pressure discharge passage or reduced-pressure chamber 12. Connecting the inlet passage and the reduced-pressure chamber 12 is a valve port 13 surrounding which is a downwardly directed valve lip 14 integral with the body.

A plug 15 threads into the bottom of the body 10 and a gasket 16 provides a gas-tight seal to prevent the escape of gas from the high-pressure inlet. A bushing 17 is inserted in a recess in the plug 15 which acts as a guide for the lower end of a valve stem 18. A pressure-reduction valve 19, attached to valve stem 18, has a seat 20 that cooperates with the valve lip 14 to control the passage of gas from the inlet passage 11 to the reduced-pressure chamber 12.

A coil spring 21, under initial compression, bears against the bottom of an annular groove 22 in the plug 15 and against the valve 19 to bias the valve seat 20 against the lip 14. Projecting from the upper side of the valve 19 is a valve guide stem 23 which slides in a guide bushing 24 fitted into a suitable hole in the body 10.

A bonnet 25 is bolted to the body 10 by bolts 26 with the edges of a main diaphragm 27 clamped tightly between the bonnet and the body. A diaphragm plate 28 is fastened to the diaphragm 27 by a bolt 29 and a nut 30. The head of the bolt makes contact with the upper end of the valve guide stem 23. A chamber 31 in the body below the diaphragm, and a chamber 32 in the bonnet above the diaphragm, provide operating space for the diaphragm. A connecting port 33 in the body connects the chamber 31 with the reduced-pressure chamber 12. The chamber 32 above the diaphragm constitutes a loading-pressure chamber for the main diaphragm 27 as will hereinafter appear.

Built in the bonnet 25 is a pilot regulator which admits gas at some preselected pressure to the loading-pressure chamber 32 at the upper side of the diaphragm 27. A central recess in a boss 34 in the bonnet receives a threaded plug 34' having a valve port 35 connecting the high-pressure pilot supply (hereinafter described) to a pilot-regulated pressure chamber 36 in the body surrounding the boss 34. A downwardly directed valve lip 35' integral with the plug 34' surrounds the valve port 35. A pilot regulator valve 37 is guided by the close fit of the valve in a central cavity provided in the plug 34'. A valve spring 38 biases the valve closed, the seating contact being made by the valve lip 35' and the valve seat material 39 which is inserted in an annular recess in the valve face. A tapped hole 40 in the body 10 and a tapped hole 41 in the bonnet 15 are connected by a pipe 42 (Fig. 2) and admit high-pressure gas to the upstream side of the pilot regulator valve from the high-pressure side of the main regulator valve 19. A restricted connecting passage 43 connects the pilot-regulated pressure chamber 36 with the loading-pressure chamber 32 of the main diaphragm 27. A small diameter bleeder passage 43' in the bolt 29 permits a limited escape of gas from the pilot into the main regulator discharge passage 12.

A spring casing 44 screws onto the bonnet 25 and clamps the edges of a pilot regulator diaphragm 45. One side of this diaphragm is subjected to the pilot-regulated pressure in the chamber 36 and the other side is loaded by a coil spring 46. The spring bears at one end against a diaphragm plate 47 and at its other end against a spring button 48. A hand operated adjusting screw 49 threaded into a bushing 50 in the spring casing 44 controls the pilot regulator delivery pressure and hence the main regulator discharge pressure.

The operation of the regulator is as follows: The inlet passage 11 is connected directly to a high-pressure gas supply. Valve 19 is of the inverse type and is initially held tightly closed by spring 21 and by the gas pressure on its upstream side. High-pressure gas is admitted to the under or upstream side of the pilot regulator valve 37 by the connecting tube 42. This valve is also of the inverse type and is initially closed because of the pressure of this gas on its upstream side and because of the pressure of the spring 38. To permit gas to flow through the regulator the adjusting screw 49 is turned down thus increasing the spring pressure on the top of the pilot regulator diaphragm until it deflects sufficiently to open the pilot regulator valve 37. This admits gas to the pilot-regulated pressure chamber 36, and through the port 43 to the loading-pressure chamber 32. When the pressure in chamber 36 reaches the value selected by the setting of the adjusting screw 49 the pressure of the spring 46 is overcome permitting the pilot regulator valve 37 to close again. A small quantity of gas is bled off the pilot regulator through the bleeder passage 43' into the main regulator discharge passage 12 to permit proper functioning of the pilot regulator. The pressure now established in chamber 36 and chamber 32 deflects the main regulator diaphragm 27 which opens valve 19 permitting gas to be delivered by the regulator. As the pressure builds up in discharge passage 12, passage 33, and chamber 31, the diaphragm 27 returns to its original position and the valve 19 closes. Any particular setting of the adjusting screw 49 results in some particular pilot regulator delivery pressure which in turn results in some particular main regulator delivery pressure.

As in all pilot-controlled regulators the diaphragm of the main regulator is loaded by a constant gas pressure rather than a spring. This is advantageous since it is the same in effect as loading the diaphragm with a spring of infinitely small spring constant. The regulator operates without chattering since the necessary damping effect to prevent chattering is supplied by the small port 43 between the loading-pressure chamber 32 and the pilot-regulated pressure chamber 36.

It will now be seen that while the regulator above described operates on known principles that have been employed in pilot-controlled regulators before, it is much more compact than previous ones since the pilot regulator and the main regulator are built into one body, thus eliminating all external gas fittings except the one high-pressure by-pass from the upstream side of the main regulator valve to the upstream side of the pilot regulator valve, and even this by-pass could be formed in the walls of the regulator body if so desired. Moreover, the usual separate gas supply tank of other pilot-controlled regulators is eliminated. Elimination of these various parts reduces the intricacy of the complete regulator, reduces the likelihood of damage and leaks, lessens manufacturing difficulties, and reduces its cost. The improved regulator has a large capacity and is much smaller in size and weight than pilot-controlled regulators of comparable capacity heretofore used. It provides high quality regulation and trouble-free performance.

I claim:

A pilot-controlled gas pressure regulator comprising a lower body portion having a high-pressure gas inlet and a reduced pressure gas outlet, an inverse type pressure reduction valve between said inlet and said outlet, an intermediate body portion having a central boss axially aligned with said pressure reduction valve, a main diaphragm supported between said lower body portion and said intermediate body portion, means operable to actuate said pressure reduction valve in response to deflection of said main diaphragm, a diaphragm chamber formed by said lower body portion and said main diaphragm, unrestricted conduit means placing said diaphragm chamber in communication with said reduced pressure gas outlet, an upper body portion coaxially and fixedly connected to said intermediate body portion, a pilot regulator diaphragm supported between said intermediate body portion and said upper body portion, an inverse type pilot regulator valve mounted in said boss, unrestricted conduit means placing said high pressure gas inlet in communication with the upstream side of said pilot regulator valve within said boss, a loading gas supply chamber formed by said pilot regulator diaphragm and said intermediate body portion, said supply chamber being on the downstream side of the pilot regulator valve and substantially surrounding the intermediate body portion boss, means operable to actuate said pilot regulator valve in response to deflection of said pilot regulator diaphragm, a main diaphragm loading chamber formed by said intermediate body portion and said main diaphragm, restricted conduit means placing said loading gas supply chamber in communication with said main diaphragm loading chamber, a bleeder passage placing said main diaphragm loading chamber in communication with said diaphragm chamber, and adjustable spring-loading means mounted in said upper body portion and acting on said pilot regulator diaphragm on the side opposite said loading gas supply chamber.

JAMES K. HAMILTON.

REFERENCES CITED

The following references are of record in the file of this patent:

UNITED STATES PATENTS

| Number | Name | Date |
|---|---|---|
| 633,662 | Schneible | Sept. 26, 1899 |
| 841,469 | Turner | Jan. 15, 1907 |
| 849,018 | Krichbaum | July 21, 1908 |
| 1,071,777 | Murphy | Sept. 2, 1913 |
| 1,701,865 | Soderberg | Feb. 12, 1929 |
| 1,891,547 | Krichbaum | Dec. 2, 1932 |
| 2,067,882 | Alessi | Jan. 19, 1937 |
| 2,082,223 | Smith | June 1, 1937 |
| 2,257,171 | King | Sept. 29, 1941 |
| 2,277,162 | Soderberg | Mar. 24, 1942 |

FOREIGN PATENTS

| Number | Country | Date |
|---|---|---|
| 403,787 | Great Britain | Jan. 4, 1934 |